US006452426B1

(12) United States Patent
Tamarapalli et al.

(10) Patent No.: US 6,452,426 B1
(45) Date of Patent: Sep. 17, 2002

(54) CIRCUIT FOR SWITCHING BETWEEN MULTIPLE CLOCKS

(76) Inventors: Nagesh Tamarapalli, 29290 SW. Pkwy. Ct., Apt. 93, Wilsonville, OR (US) 97070; Ronald Press, 10720 SW. Willow St., Tualatin, OR (US) 97062

( * ) Notice: Subject to any disclaimer, the term of this patent is extended or adjusted under 35 U.S.C. 154(b) by 0 days.

(21) Appl. No.: 09/836,700

(22) Filed: Apr. 16, 2001

(51) Int. Cl.[7] .............................................. H03K 17/00
(52) U.S. Cl. ...................... 327/99; 327/166; 327/176; 327/199; 327/294; 327/298
(58) Field of Search .............................. 327/97, 98, 99, 327/166, 176, 197, 198, 199, 200, 202, 213, 407, 298, 299, 291, 293, 295

(56) References Cited

U.S. PATENT DOCUMENTS

| | | | |
|---|---|---|---|
| 4,398,155 A | 8/1983 | Atwell, Jr. et al. | 375/107 |
| 4,419,629 A | 12/1983 | O'Brien | 327/99 |
| 4,853,653 A | 8/1989 | Maher | 327/99 |
| 4,855,616 A | 8/1989 | Wang et al. | 327/298 |
| 4,870,299 A | 9/1989 | Chen | 327/99 |
| 4,899,351 A | 2/1990 | Bonke | 327/144 |
| 4,965,524 A | 10/1990 | Patchen | 327/99 |
| 4,970,405 A | 11/1990 | Hagiwara | 327/145 |
| 5,059,925 A | 10/1991 | Weibloom | 331/1 A |
| 5,122,677 A | 6/1992 | Sato | 327/99 |
| 5,155,380 A | 10/1992 | Hwang et al. | 327/99 |
| 5,274,678 A | 12/1993 | Ferolito et al. | 375/108 |
| 5,291,528 A | 3/1994 | Vermeer | 375/106 |
| 5,315,181 A | 5/1994 | Schowe | 327/292 |
| 5,448,597 A * | 9/1995 | Hashimoto | 375/354 |
| 5,483,185 A | 1/1996 | Scriber et al. | 327/99 |
| 5,564,042 A | 10/1996 | Ventrone et al. | 395/550 |
| 5,579,350 A | 11/1996 | Furukawa et al. | 375/371 |
| 5,579,353 A | 11/1996 | Parmenter et al. | 375/376 |
| 5,583,461 A | 12/1996 | Lowe | 327/172 |
| 5,623,223 A * | 4/1997 | Pasqualini | 327/298 |
| 5,638,015 A * | 6/1997 | Gujral et al. | 327/144 |
| 5,675,615 A | 10/1997 | Watt | 375/354 |
| 5,719,517 A * | 2/1998 | Nakao | 327/291 |
| 5,726,593 A | 3/1998 | Ruuskanen | 327/99 |
| 5,790,609 A | 8/1998 | Swoboda | 375/357 |
| 5,952,863 A * | 9/1999 | Jones et al. | 327/295 |
| 6,107,841 A | 8/2000 | Goodnow | 327/99 |
| 6,278,302 B1 * | 8/2001 | El-Kik | 327/143 |

* cited by examiner

Primary Examiner—Timothy P. Callahan
Assistant Examiner—An T. Luu
(74) Attorney, Agent, or Firm—Klarquist Sparkman, LLP

(57) ABSTRACT

A circuit to synchronously select one of the multiple clocks is presented. In one embodiment the selection circuit consists of four main blocks. These are the stable selects block, the decoder block, the synchronous selects block, and the output block. The stable selects block takes select signals as inputs and outputs a signal indicating whether the selects are stable or not, in addition to producing select signals that are synchronous to the current selected clock. The decoder block, decodes the select signals if they are stable, otherwise it re-circulates the previous values of the decoded clock select signals. The stable decoded select signals are then passed on to the synchronous selects block. This block outputs select signals in synchrony with their respective clocks. The synchronous select signals along with the stable decoded signals are used in the output block along with the clocks themselves to generate the final output clock. The transition from the first clock to the second clock is achieved with out any clips or glitches on the output clock. In order to eliminate the possibility of a glitch the first clock is disengaged from the output clock during the first clock's low state. This low state is maintained on the output clock until it is deemed safe to engage the second clock to the output clock during the second clock's low state.

41 Claims, 12 Drawing Sheets

BINARY ENCODED STABLE SELECTS BLOCK

BLOCK DIAGRAM OF A CLOCK SWITCHING CIRCUIT

BINARY ENCODED STABLE SELECTS BLOCK

ONE-HOT ENCODED STABLE SELECTS BLOCK

ONE-HOT ENCODED STABLE DECODER BLOCK

TIMING DIAGRAM SHOWING SPURIOUS PULSE AND SWITCH FROM CLK C TO CLK B

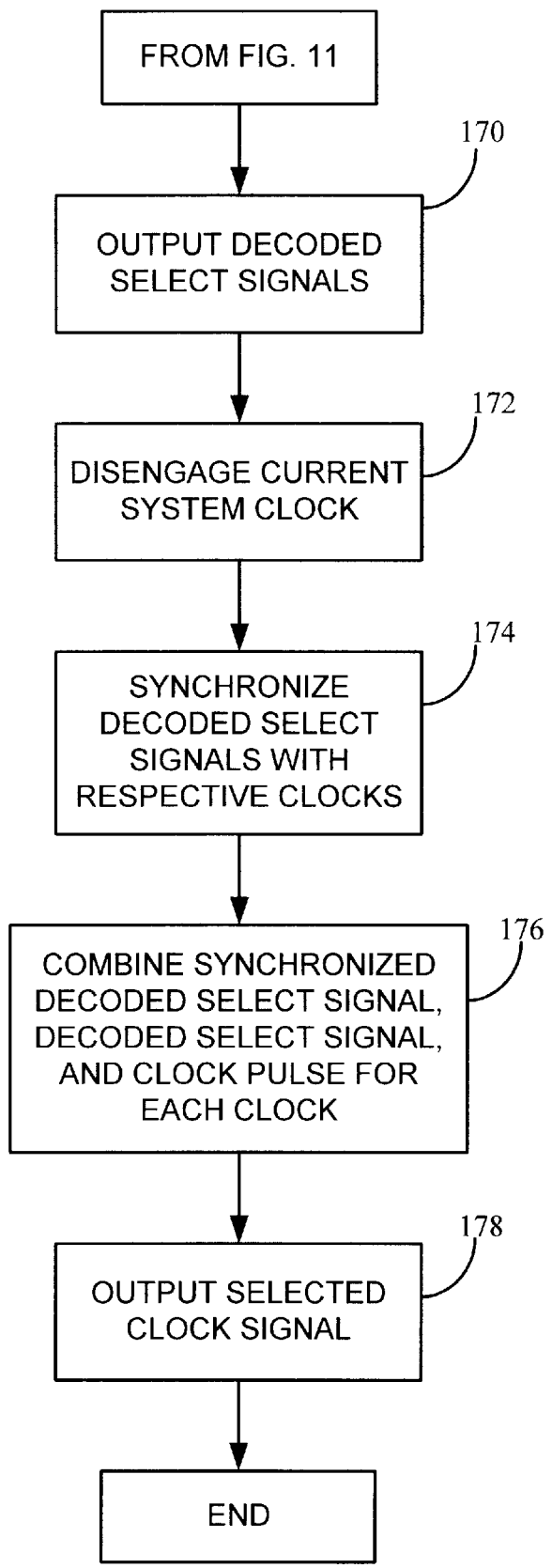

CIRCUIT FOR SWITCHING BETWEEN MULTIPLE CLOCKS

FIELD OF INVENTION

This invention relates generally to clock switching circuits and more particularly relates to a circuit to perform glitch-free selection of one clock signal from multiple clock signals.

BACKGROUND OF THE INVENTION

The present day integrated circuits are highly complex, typically containing disparate pieces of circuits, such as millions of gates of logic and memory with different capabilities and characteristics. These circuits are, in general, synchronous circuits that is their operation is coordinated by master signals called clocks.

Some integrated circuits have to operate using multiple clocks. The frequencies of different clocks may or may not be integral multiples of one another. In addition, current circuits may have multiple modes of operation that could result in different rates of operation. For example, a circuit may have a high-frequency mode whenever it is necessary to process data at a faster rate and a low-frequency mode whenever it is necessary to reduce power dissipation. Such different modes of operation require different clocks operating at different frequencies. Yet another situation where a circuit may have to operate with multiple clocks, having unrelated frequencies, is when a circuit needs to be tested. Since external testers are typically slower than the circuits that are being tested, during testing the circuit may be supplied with a clock that is much slower than the regular system clock. In all these scenarios it is necessary to reliably select one of the multiple synchronous or asynchronous clock signals as the system clock.

Whenever the system clock needs to be switched to a different clock, this switching must be performed in a glitch-free manner, by avoiding pulses of width less than that determined by the fastest clock. Another concern when switching between multiple clocks is the possibility of metastability. The clock selection/switch circuit should provide means to reduce the probability of metastability.

There has been a lot of work in the area of clock selection/switching circuits. However, a majority of this work is limited to two clocks only. There are some references that describe circuits that are not limited to two clocks, but these circuits are overly complex. References U.S. Pat. Nos. 4,853,616, 4,970,405, and 6,107,841 are capable of handling multiple clocks and are less complex. However, U.S. Pat. Nos. 4,853,616 and 6,107,841 utilize one-hot encoded select signals to select one clock among multiple clocks. That is, each clock signal has a corresponding select signal that when high results in the selection of the corresponding clock signal. One-hot encoding for select signals implies that as the number of clocks increases so does the number of select signals, i.e., N clock signals will require N select lines. In addition, if the one-hot encoding is not strictly enforced (i.e., if more than one select signal is at a high state), then the output clock will be a combination of all the selected clocks. Such a clock can have arbitrary waveform and can easily corrupt the system.

In addition, reference U.S. Pat. No. 6,107,841 relies on a special signal to indicate when to switch the clocks. This signal, which is driven high after setting proper values on the select lines, needs to be in this high state for a very precise amount of time. Otherwise, the clock selector circuit will try to switch the current clock with itself, resulting in unnecessary dead cycles.

Reference U.S. Pat. No. 4,970,405 utilizes binary encoded select signals, resulting in ceil($\log_2$N) select signals for N clock signals. However, it does not eliminate the possibility of glitches on the output clock. This is because the select lines pass through several levels of combinational logic before being gated with the clocks. Depending on the relative delays of the clock and select signals, there is a possibility of occurrence of glitches on the output clock. Glitches or pulses that are less than those determined by the fastest clock can corrupt the circuit.

Thus, it is desirable to provide a circuit that is capable of switching between multiple clocks while reducing or eliminating glitches and metastability. Furthermore it is desirable to not limit the encoding of clock selection signals to any particular style.

SUMMARY

The proposed invention has the ability to reduce or eliminate glitches and metastability while selecting one clock from multiple asynchronous and/or synchronous clocks.

In one aspect, a circuit or block for determining the stability of the input select signals ("the stable selects block") monitors the input select signals and activates a selects stable signal that indicates the select signals have been stable for at least a predetermined number of clock cycles. For as long as it is determined that the select signals are unstable, the selects stable signal is deactivated to signify that the select signals are not ready yet.

In another aspect, a circuit or block for decoding and propagating only select signals that are stable, ("the stable decoder block") takes select signals as well as the selects stable signal from the stable select block. This decoder block decodes the select signals, and depending on the selects stable signal, passes on either these newly decoded select signals or the previously decoded select signals. As long as the selects stable signal is deactivated, the decoder re-circulates the previously decoded select signals. The exact configuration of the decoder block depends on the type of encoding scheme used for the input select signals. For example, the stable decoder block could include logic gates, such as AND, OR, and inverter gates for binary encoding, one-hot encoding, etc.

In another possible aspect, a circuit or block for synchronizing the decoded select signals to their corresponding clocks ("the synchronous selects block") takes as input, the decoder output select signals and generates select signals that are in synchrony with their respective clocks. These are then supplied to a circuit or block for selecting and outputting the correct selected clock ("the output block"), which in one possible embodiment, combines (such as by using AND gates) the synchronous selects, their corresponding decoded select signals, and clocks. The outputs of the AND gates are then combined with an OR gate to obtain the final system or output clock. One skilled in the art would know that equivalent logic gates, combinations of gates, or other logic could easily be designed and used instead.

It is noteworthy that the present invention achieves glitch-free clock switching because of several features. First, there is a mechanism in the proposed invention to identify changes on the input select signals and ignore their values until they become stable. In the outlined embodiment the stable selects block produces a signal to indicate to the stable decoder block when the new select signals are ready to be used. This occurs only when the select signals are stable for at least a predetermined number of system clock cycles, thus eliminating multiple clock switches that can happen, due to race conditions, when more than one select signal changes. Yet another possible feature that contributes to the glitch-free clock switch is the fact that the decoded select signals and the synchronous select signals are fed directly to the output block. That is, these signals do not have to propagate through any combinational logic to reach the output block. This has the beneficial effect of eliminating the possibility of glitches on the output clock. In addition, the probability of metastability can be reduced to close to being insignificant by the use of serially coupled memory devices ("stages"), such as flip-flops, in the stable selects block and the synchronous selects block. By increasing the number of flip-flop stages in the stable selects block and the synchronous selects block the probability of metastability can be rendered virtually inconsequential. However, the trade-off with increasing the number of flip-flop stages in these blocks is that it will increase the time required to switch clocks.

Further features and advantages will become apparent with reference to the following detailed description and accompanying drawings.

BRIEF DESCRIPTION OF THE DRAWINGS

FIG. 12 is flow chart of a method illustrating additional process blocks that may be used in conjunction with FIG. 11.

DETAILED DESCRIPTION

Overview of Clock-Switching System

Figure 1:
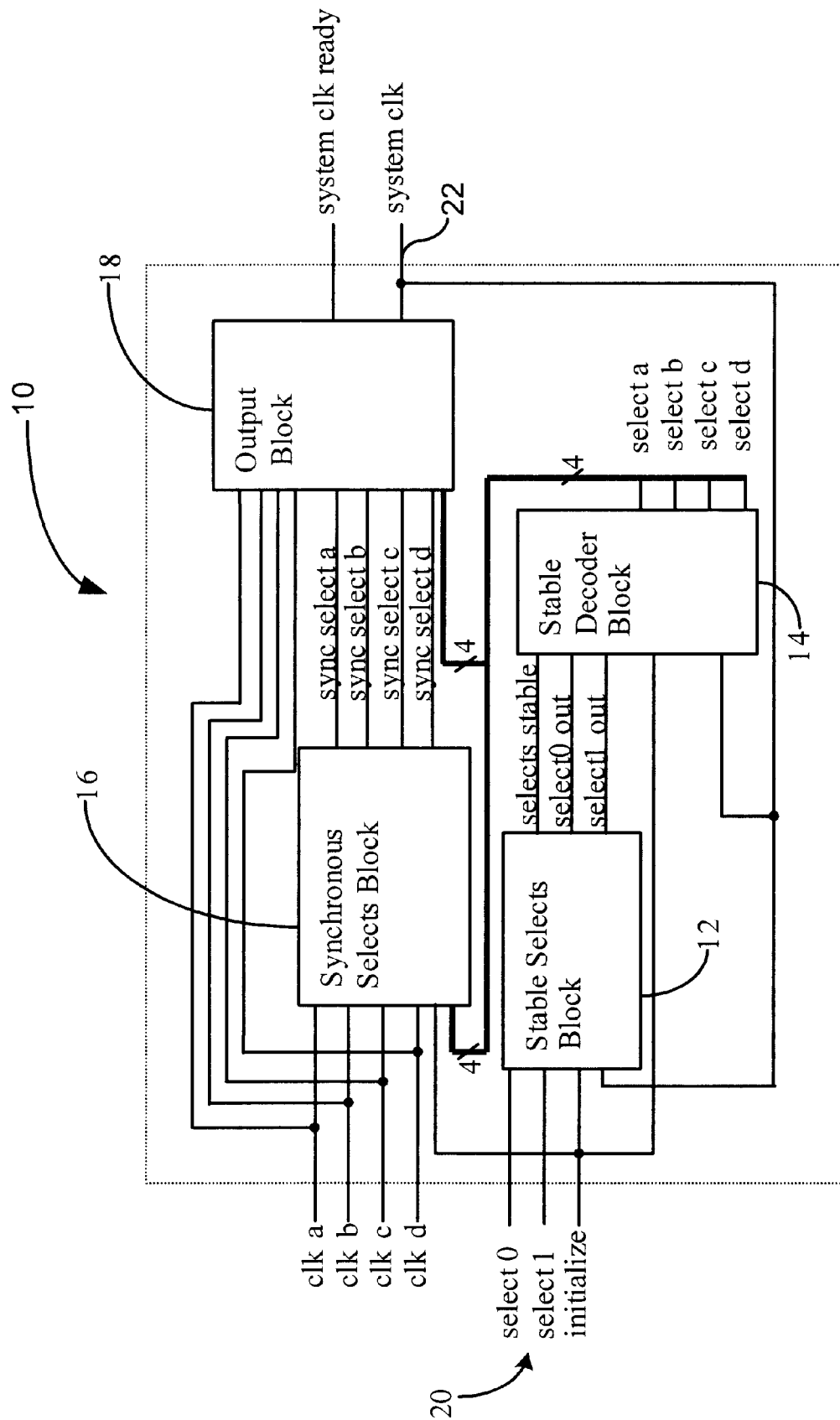
FIG. 1 is a block diagram depicting the top-level clock selection circuit including a stable selects block, a stable decoder block, a synchronous selects block, and an output block.

The top-level block diagram of one embodiment is illustrated in FIG. 1. This figure presents a clock selector circuit 10 for switching between one of four input clocks (clk a, clk b, clk c, clk d). The circuit 10 is shown with four blocks for purposes of illustration: the stable selects block 12, the stable decoder block 14, the synchronous selects block 16, and the output block 18. Select signals 20 are input to the stable selects block 12 to select which one of the multiple clocks a, b, c, and d are to be used as a system clock 22. Generally, the stable selects block 12 ensures the select signals 20 are stable before being used to switch the system clock 22. The stable decoder block 14 is used to decode selection signals from the stable selects block 12 and decides whether to use such selection signals or whether to maintain its current state because the selection signals are not stable. The synchronous selects block 16 synchronizes decoded selection signals from the decoder block 14 with the input clocks a, b, c, d. Finally, the output block 18 receives the clock signals themselves, decoded signals from the stable decoder block 12, and synchronous signals from the synchronous selects block 16 and outputs the system clock 22.

In this embodiment, no assumptions are made regarding the source of the multiple clocks a, b, c, d, whether the multiple clocks are synchronous with each other or in phase with each other. Although the figures used herein only describe a system with four clocks, the circuit is easily adapted to use any number of clocks. Additionally, the circuit of FIG. 1 shows only two select signals 20 to select one of the four clocks. As is well known in the art, such a selection scheme is called binary encoding. As is further described below, other clock selection schemes may be used, such as one-hot, two-hot, Gray encoding. Whatever encoding scheme is used, the number of select signals varies based on the number of input clocks.

Example of Clock-Switching System using Binary Encoding

Figure 2:
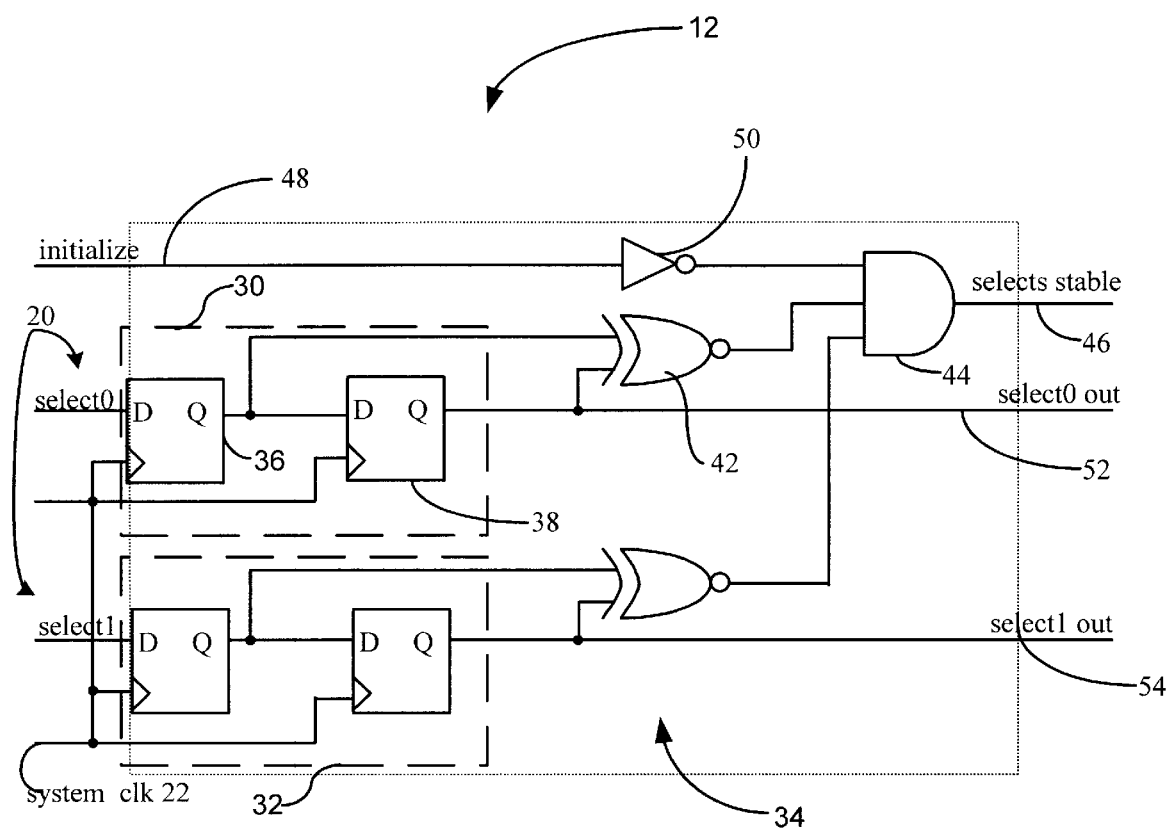
FIG. 2 is a circuit diagram illustrating one example of the stable selects block of FIG. 1 using binary encoding.

One example of the stable selects block 12 is shown in FIG. 2. In this example, a binary encoding scheme is used. Such an encoding scheme for N clocks requires a minimum of $\lceil \log_2 N \rceil$ input select signals. For example, if the number of clocks is 3 or 4 then the minimum number of input select signals is 2. Similarly if the number of clocks is anywhere between 5 to 8 then the minimum number of input select signals is 3 and so on. No assumption is made about the timing of these input select signals 20, i.e., they may or may not be completely asynchronous with respect to each other and to the clocks under consideration. The stable selects block includes registers 30, 32 (one for each input select signal) and logic 34 for determining whether the input select signals are stable. The registers 30, 32 are clocked by the current system clock 22. Although, in the illustrated embodiment, there are as many registers as the number of select signals, the particular structure of the stable selects block 12 can easily be modified to suit the particular design. For example, other registers could be added for additional select signals or registers may be excluded for some select signals. For clarity, only register 30 and its associated signals and structures are discussed as the other registers have a similar structure. Register 30 contains two serially-coupled memory devices. In the illustrated example, the memory devices are D-type flip-flops 36, 38, but other memory devices can easily be substituted (e.g., JK-type flip-flops, T (toggle) flip-flops, other types of flip-flops, latches, etc.). Also, the number of memory devices can be increased to reduce the probability of metastability. Thus, register 30 may include any number of (e.g., 1, 2, 3, 4, 5 . . . ) memory devices coupled in series and this number can be different for different registers. Further, although in the illustrated embodiment there are two memory devices in a register, the number of memory devices could be reduced to one in order to speed the clock transition. The outputs of the registers 30, 32 are fed to the logic 34 for a determination of whether the select signals 20 are stable for at least a predetermined number of system clock cycles. For example, for register 30, the outputs of flip-flops 36, 38 are fed to an XNOR gate 42. The XNOR gate has the property that its output is active (e.g., high) only when all its inputs are at the same logic state. The output of the XNOR gates corresponding to each select signal is then ANDed using AND gate 44 to generate the final selects stable signal 46. This signal indicates if each of the select signals has been stable for at least as many clock cycles as the number of flip-flops in the registers. In an alternative embodiment, the input of the first flip-flop 36 and the output of the last flip-flop 38 could be fed to the XNOR gate 42. These flip-flops could also have one or more other flip-flops between them whose input and/or output was not fed to the XNOR gate 42.

In the current example, the predetermined period of time that the select signals need to be stable is two clock cycles of the system clock because the registers (i.e., register 30) have two flip-flops. In this example, the predetermined period of time corresponds to the number of flip-flops in the registers, but another method of designating the predetermined period of time, which does not involve the flip-flops in the registers, could easily be designed. The term "stable" as used herein is understood to include the context of race conditions, glitch-free signals, signals with a low probability of metastability, and/or signals whose logic state has not been modified for at least a predetermined period of time.

An initialize signal 48 is passed through inverter 50 whose output is also gated to the AND gate 44, but this initialization signal is primarily used during an initialization phase, which will be discussed below.

Thus, the outputs of stable selects block 12 include the output select signals 52, 54 and a flag or selects stable signal 46 indicating whether the output select signals 52, 54 are stable or not. The output select signals 52, 54 are synchronous to the current system clock 22 and have reduced metastability due to passing through the registers 30, 32.

Figure 3:
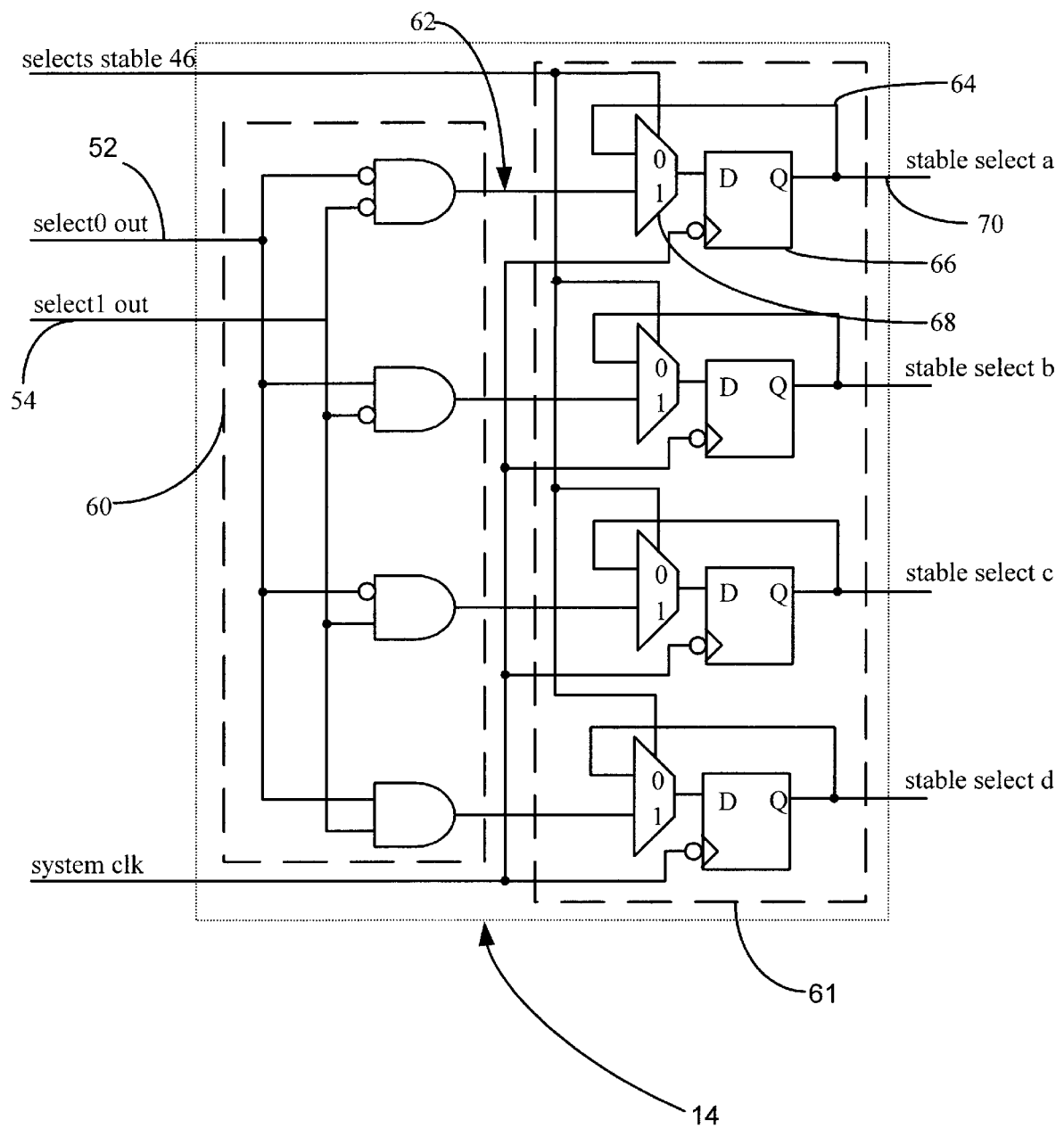
FIG. 3 is a circuit diagram illustrating one example of the stable decoder block of FIG. 1 using binary encoding.

FIG. 3 shows the stable decoder block 14. The stable decoder block 14 includes a decoder 60 and a storage circuit 61. The decoder 14 decodes the select signals 52, 54 from the stable selects block 12 and determines whether to pass on either the newly decoded select signals 62 or the previously decoded select signals 64. This determination is based on the selects stable signal 46 from the stable selects block 12.

The decoder 60 contains logic to decode the select signals 52, 54. The decoder 60 provides up to $2^S$ outputs for S inputs. In the illustrated case, the two input select signals 52, 54 (select0 out, select1 out) produce four outputs 62 having the property that only one of the outputs is activated for any given combination of the input select signals to indicate the selection of the corresponding clock. Notice that the number of clocks N can be less than the maximum possible number of decoder outputs $2^S$. In such a case, the additional outputs may or may not be used.

The storage circuit 61 includes a memory element and multiplexer, such as memory element 66 and multiplexer 68, corresponding to each of the decoded select lines 62 from the decoder 60. For simplicity, only memory element 66 and multiplexer 68 is described. Other memory element and multiplexer combinations for the other decoded select lines function similarly. In the illustrated embodiment, the memory element 66 is shown as a D-type flip-flop but other memory elements may be used as already described.

Table 1 (below) illustrates the binary encoded select signals, the corresponding decoded select signals, and the system clock. The newly decoded select signals 62 and the previously decoded select signals 64 (obtained from the Q output of the D flip-flop 66) form inputs to the 2-input multiplexer 68 in the stable decoder block. It is desirable to implement the multiplexor such that no glitches appear at its output. This can be achieved by including the consensus term (A*B) to the standard multiplexer implementation of (S*A+SBAR*B), where S, SBAR are the select and inverted versions of the select signal respectively, and A and B are inputs to the multiplexer. The select signal of multiplexer 68 is driven by the selects stable signal 46 from the stable selects block 12. Thus, if the selects are indicated as stable by the selects stable signal, the newly decoded select signal 62 is passed on as the data input to the D flip-flop 66. Otherwise, the previously decoded select signal 64 is fed back through the multiplexer 68 to the D flip-flop 66. An output 70 (designated as "stable select a") of D flip-flop 66 is connected to the synchronous selects block 16. Similarly, stable select signals are generated for decoded signals b, c, and d.

TABLE 1

Binary Encoded Selects, Corresponding Decoded Selects and System Clocks

| select0 select1 | select d select c select b select a | system clk |
|---|---|---|
| 00 | 0001 | clk a |
| 01 | 0010 | clk b |
| 10 | 0100 | clk c |
| 11 | 1000 | clk d |

Figure 4:
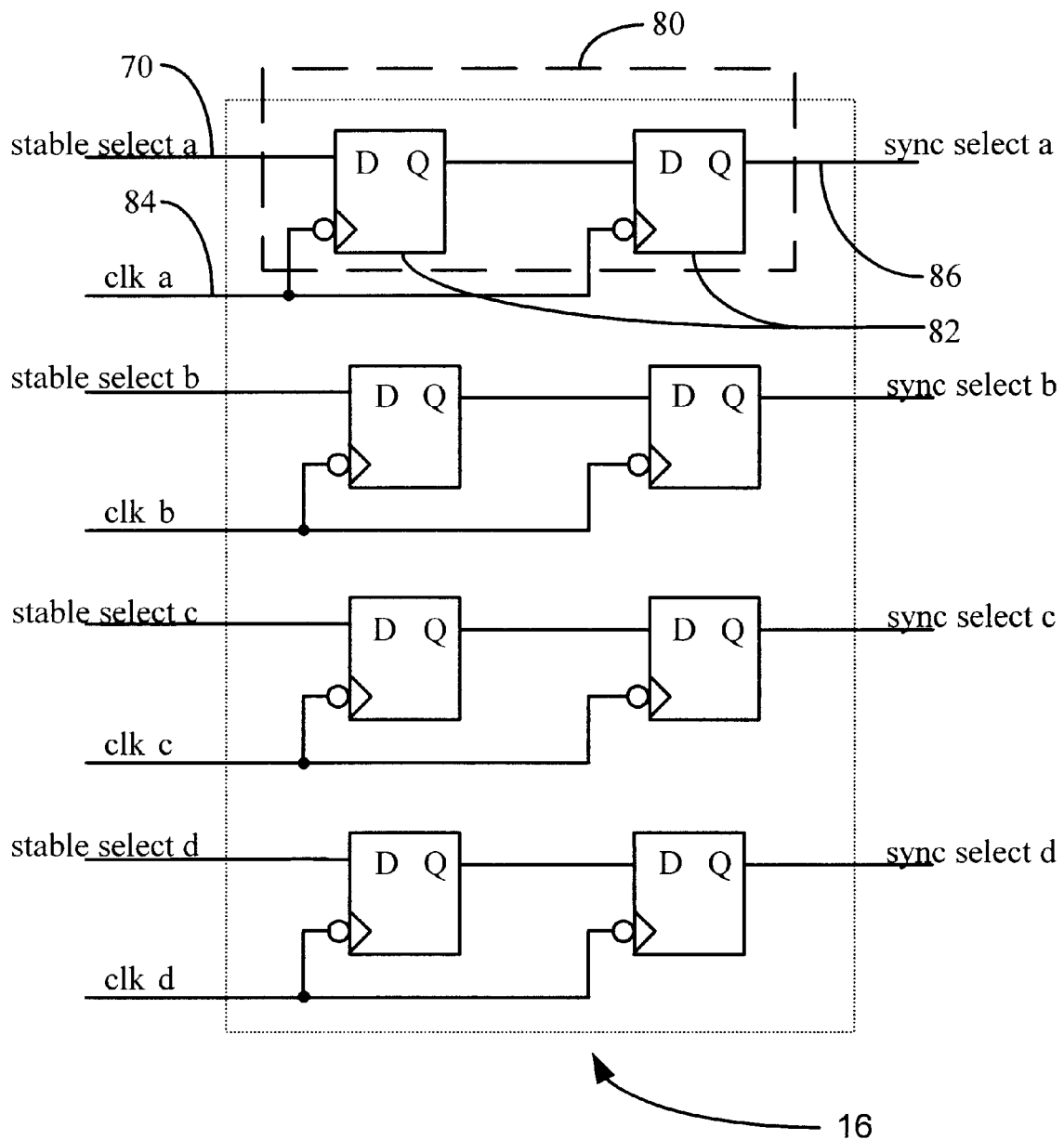
FIG. 4 is a circuit diagram illustrating one example of the synchronous selects block of FIG. 1.

FIG. 4 shows the synchronous selects block 16 in more detail. The synchronous selects block 16 has four separate sets of registers coupled in parallel to process the four outputs provided from the decoder 14. Only one register 80 is described for simplicity.

The input signal 70 is passed through register 80 having serially-coupled memory elements 82 (e.g., D flip-flops, RS flip-flops, etc.) clocked by clock 84 corresponding to the select signal. The number of registers in the synchronous selects block 16 can be equal to the number of clocks, which in this example is four. Although FIG. 4 illustrates registers composed of two memory elements, this number can be varied based on the concerns about metastability. Increasing the number of stages reduces the probability of occurrence of metastability, but increases the time needed to switch clocks. Each register produces an output, such as output 86, which is the select signal synchronized with its corresponding clock. These output signals are designated sync select a, sync select b, sync select c, and sync select d, and are connected to the output block 18, as further described below.

Figure 5:
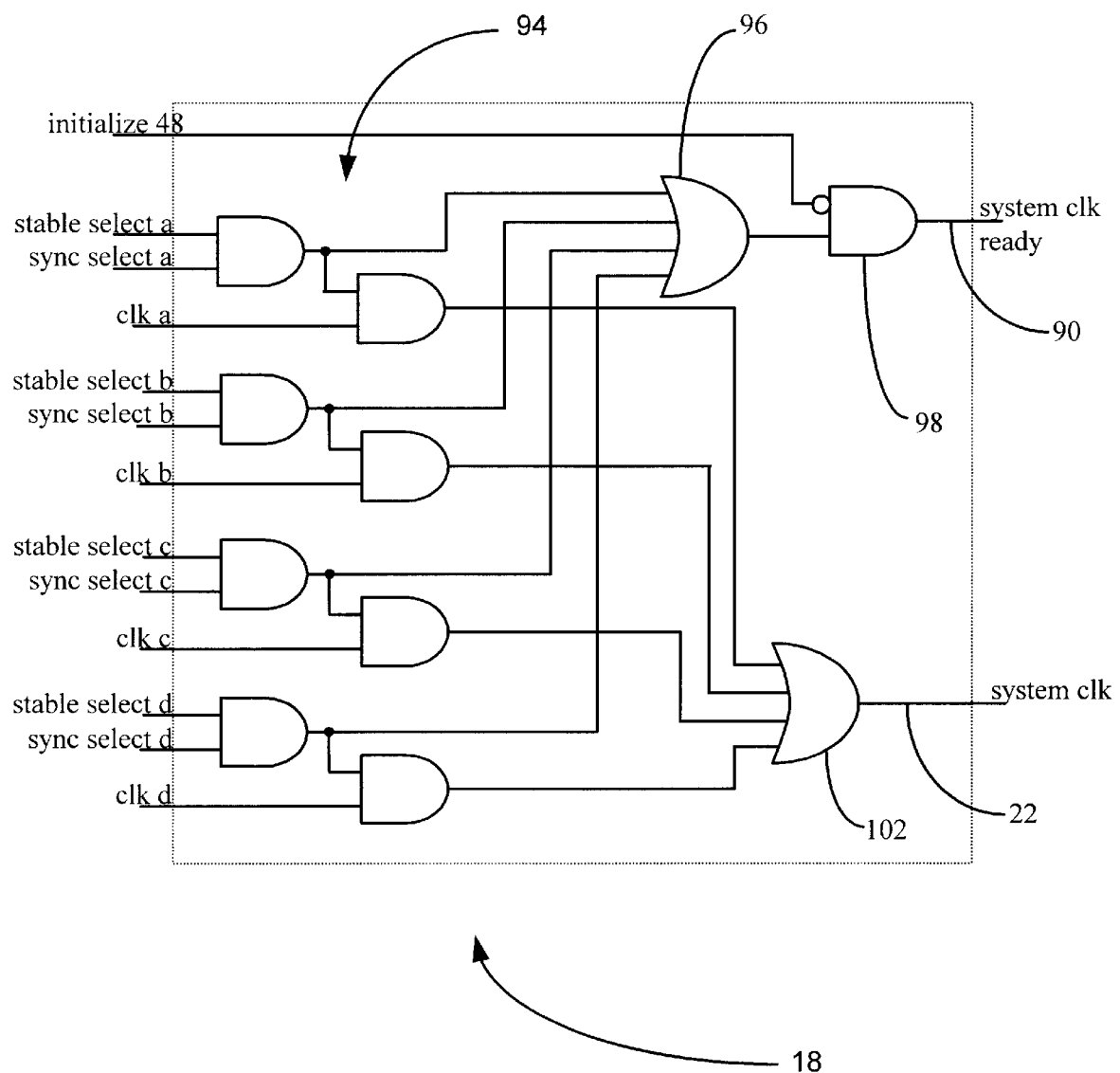
FIG. 5 is a circuit diagram illustrating one example of the output block of FIG. 1.

FIG. 5 shows further details of the output block 18. The inputs to block 18 include the stable select outputs from the decoder block 14 (FIG. 3), the synchronous select signals from the synchronous selects block 16 (FIG. 4), and the clock inputs (clk a, clk b, clk c and clk d). The illustrated block 18 has duplicate structures to process four sets of these inputs, all of which are identical. For clarity, only the structures for one set of inputs are discussed.

With the above inputs, the output block 18 produces a system clk ready signal on output 90 and a system clk signal 22. In this embodiment, to produce the system clk ready signal, the decoded select signals and the synchronous select signals are input through logic gates, such as AND gates 94. The outputs of the AND gates are combined together using an OR gate 96. The output of the OR gate 96 is combined with an inverted initialize signal 48 using AND gate 98. The output of this last AND gate 98 is the system clock ready signal, which indicates when the selection of the system clock is in transition. In the illustrated embodiment, it indicates a transition beginning when the selects stable signal 46 indicates stability (values of incoming stable select signals change) and ending when the synchronous select signals have finished propagating through the synchronous selects block into the output block (values of incoming synchronous select signals also change).

To produce the output clock, each clock is combined, such as by using AND gates 94, with its corresponding stable select signal and synchronous select signal. The outputs of the AND gates are then combined using OR gate 102 to obtain the final clock signal output as the system clock 22.

Example of Clock-Switching System using One-Hot Encoding

Figure 6:
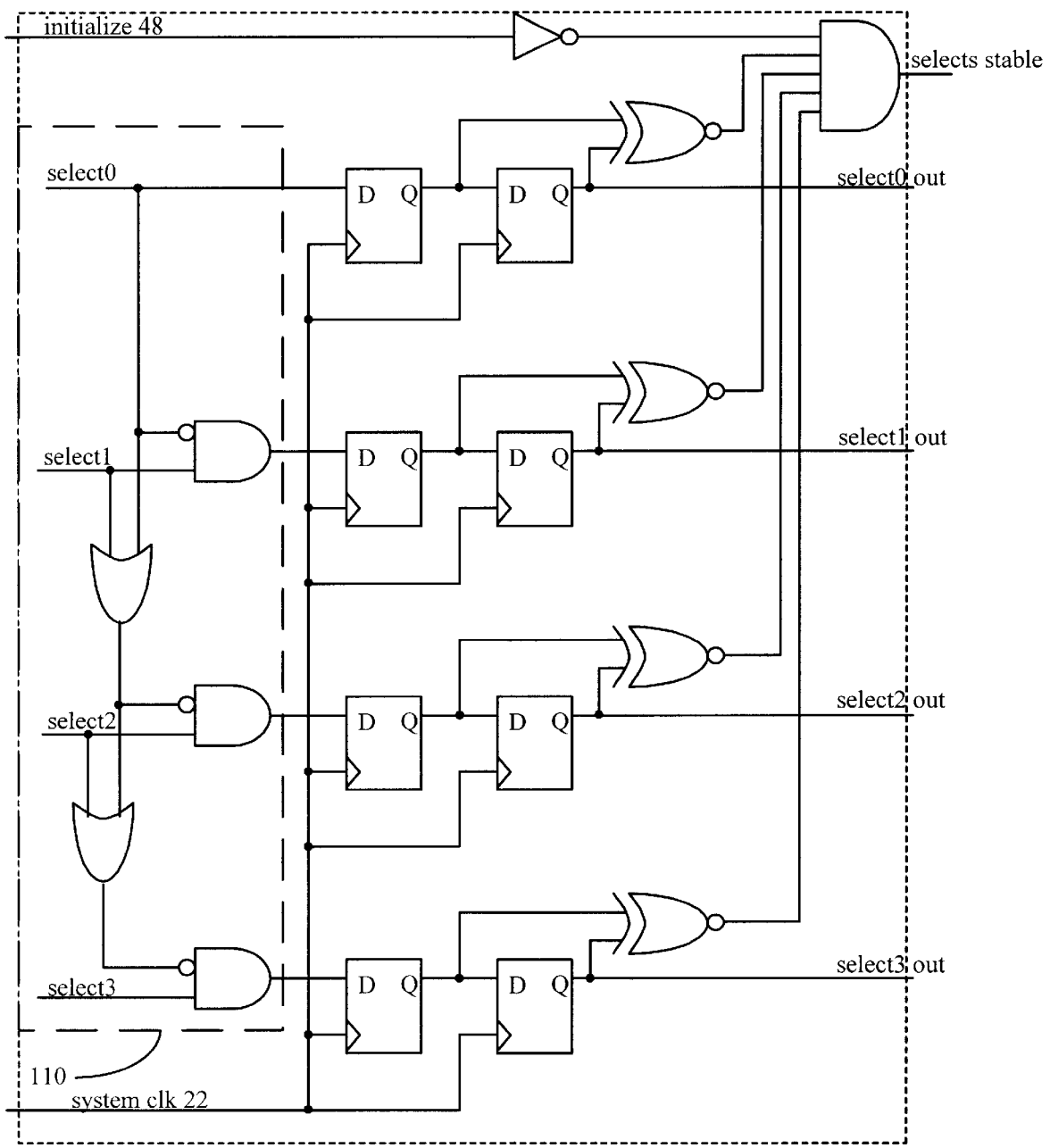
FIG. 6 is a circuit diagram illustrating another example of the stable selects block of FIG. 1 using one-hot encoding.
Figure 7:
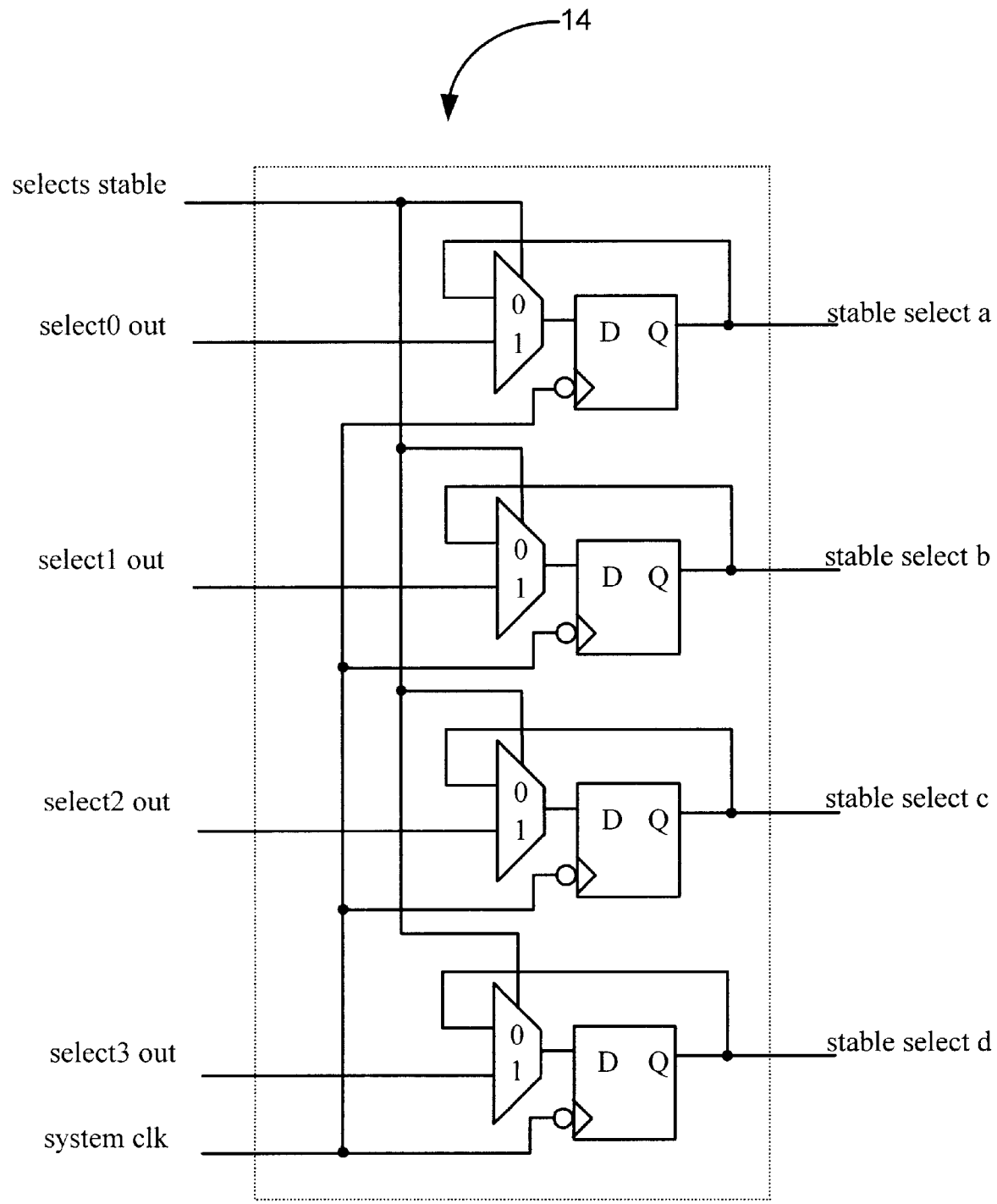
FIG. 7 illustrates another example of the stable decoder block of FIG. 1 using one-hot encoding.

FIGS. 6 and 7 show another possible embodiment using one-hot encoding. One-hot encoding refers to having a one-to-one correspondence between the select signals and the corresponding clocks. Thus, if a select signal is active, the system clock 22 is switched to the corresponding clock of the select signal. Of course, it is desirable to prevent two select signals from being active at the same time. Logic 110 is used for enforcing one-hot encoding. In this embodiment the logic 110 is implemented with AND and OR gates arranged such that, starting from the top, if a select signal is active (has logic selecting its corresponding clock), all selects below are forced to be deactivated. In the illustrated embodiment, the select lines are active high, but active low signals may also be used. This enforcement logic 110 is desirable to prevent more than one clock from being selected. Selecting more than one clock would result in the system clock being composed of a combination of the pulse signals of the selected clocks—a result that could easily corrupt a system. The rest of the block, for testing if the selects are stable, is essentially the same as FIG. 2 (binary encoded selects block), and is not described further.

FIG. 7 shows the decoder block 14 of FIG. 1, but for a one-hot encoding. Its logic for decoding one-hot encoded signals is just simple wires or buffers. The implementation of the logic that either passes through the decoded signals or previously stored ones, depending on whether the decoded select signals are stable, is the same as described in FIG. 3. Also, the synchronous selects block and the output block for this alternative embodiment using one-hot encoding may be the same as that shown in FIGS. 4 and 5.

Initialization of the System

The operation of a particular embodiment of the glitch-free clock selector circuit will now be outlined in the following, beginning with the initialization phase—when the system served by the clocks is first started. It should be noted that some of the blocks, such as the stable selects block 12 and the stable decoder block 14 are clocked by the current system clock. However, at the beginning, the D flip-flops in the circuit have arbitrary states and hence without proper initialization it is not clear which clock is the current system clock. Thus, it is necessary to have some initialization period, during which one of the clocks will be chosen as the system clock. This is accomplished by injecting appropriate values into the D flip-flops in the stable decoder and the synchronous selects block.

Figure 8:
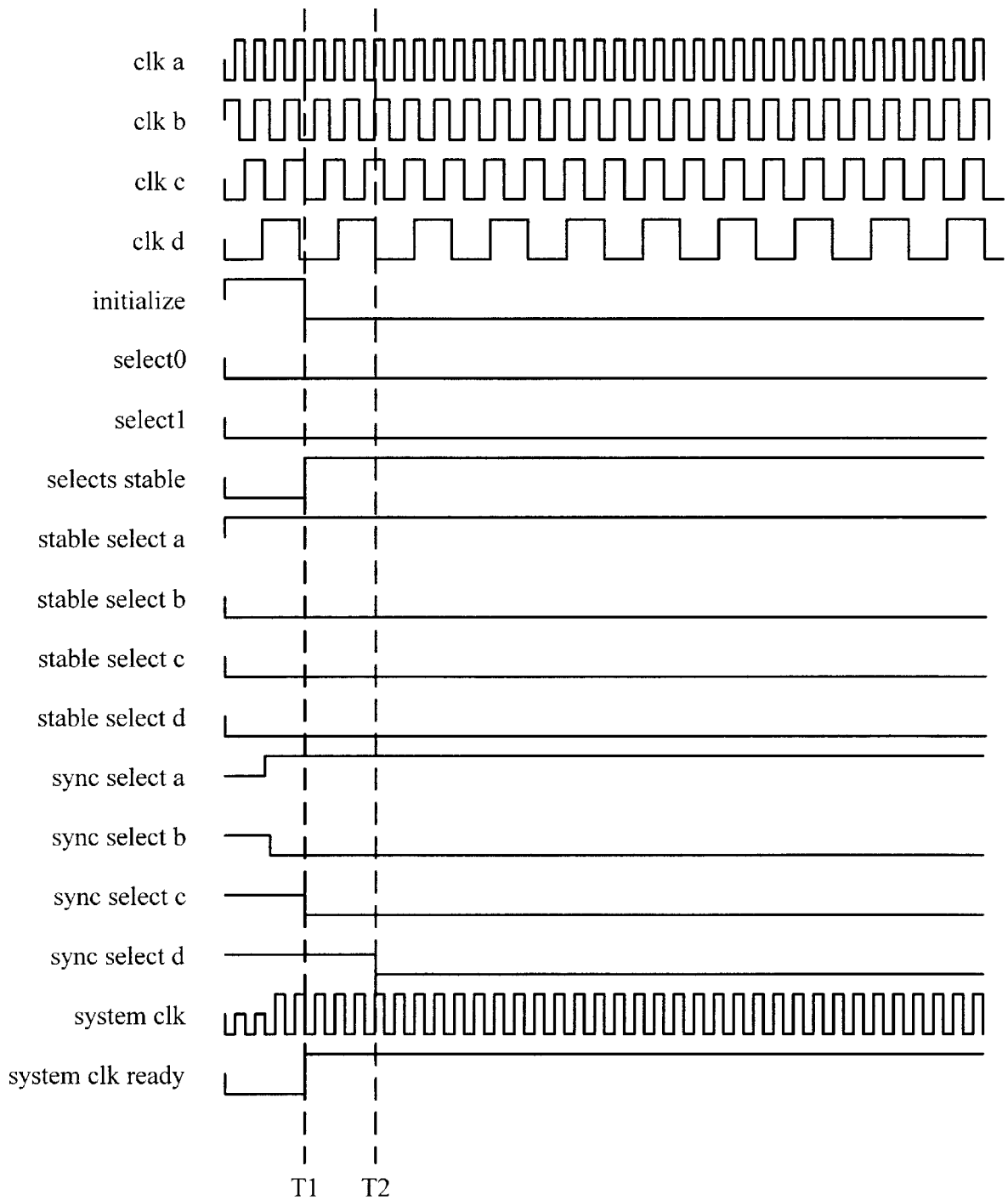
FIG. 8 shows a timing diagram during the initialization phase of the circuit of FIG. 1.

FIG. 8 illustrates the timing waveform for the initialization phase of the binary encoding embodiment of FIG. 2 and 3. Initialization of the one-hot encoding is substantially similar and is not described. In FIG. 8, the input select signals (i.e., select0 and select1) are maintained at zero, and the initialize input is held at high up to time T1. Notice that for the first two cycles, the system clock 22 is undefined, and then clk a is selected as the current system clock, since both select0 and select1 are maintained at zero. In order to ensure proper initialization of all flip-flops in the circuit, the initialize signal needs to be held high for at least some number of cycles of the intended system clock. This number is the sum of the maximum number of flip-flop stages in the registers of the stable selects block and the synchronous selects block. In this example, the intended system clock is clk a, and the total number of flip-flop stages in of stable selects block 12 and synchronous selects block 16 is four (two in each of the blocks). Thus the initialize signal is held high for four cycles of clk a. By time T2, as shown in the diagram, all flip-flops in the synchronizer circuit are initialized to proper values.

Example Timing Diagram showing switching of the System Clock

Figure 9:
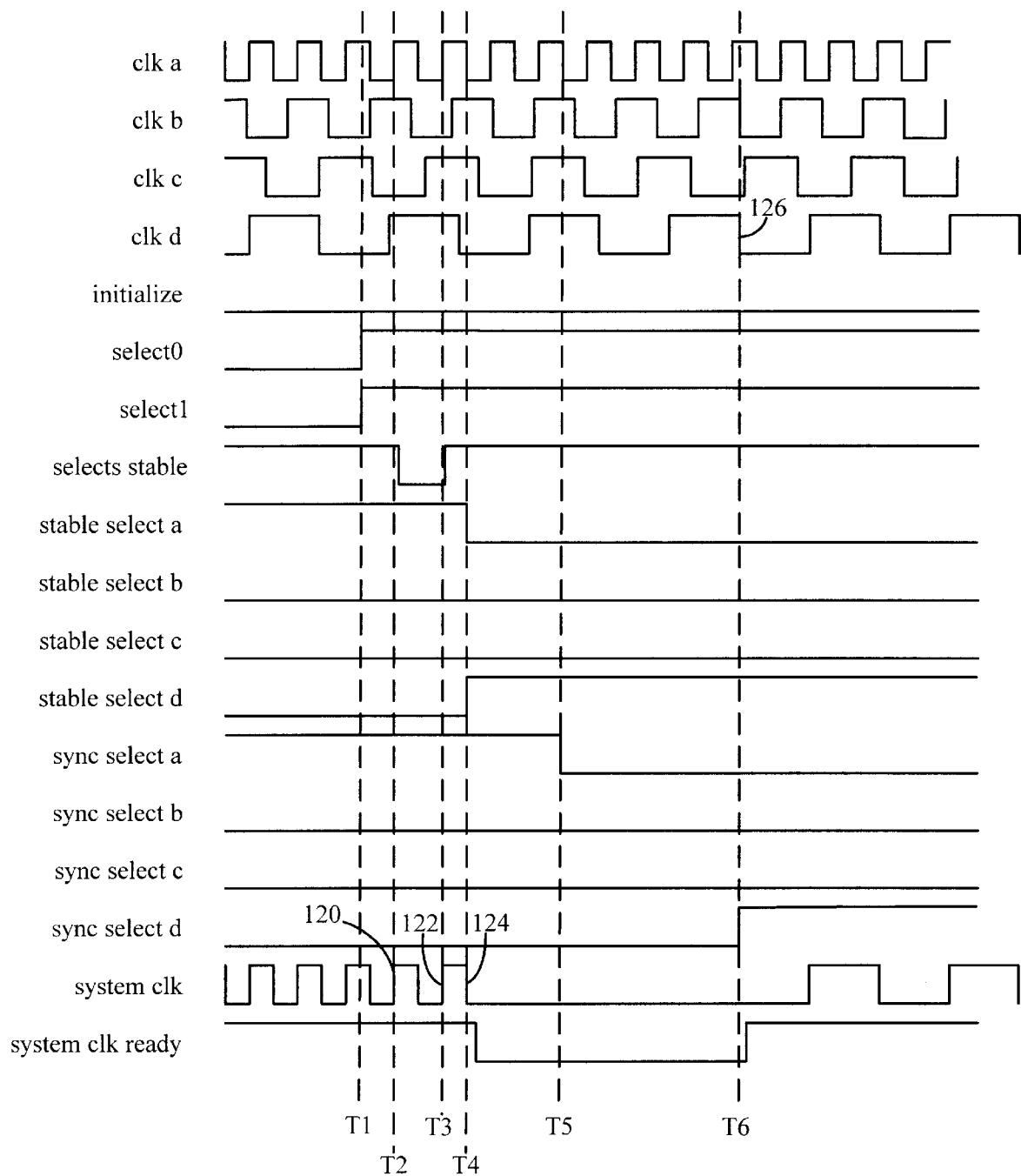
FIG. 9 shows a timing diagram for a clock switch from clk a to clk d.

FIG. 9 illustrates events that occur, in the binary embodiment, when the selected clock is switched from clk a to clk d. To initiate this clock switch, input select signals 20 are changed from "00" to "11" at time T1. The change in the select signals 20 causes the first D flip-flop 36 in the stable selects block 12 to change on the following first rising edge 120 of the current system clock at time T2. This causes the selects stable signal 46 to go low, slightly after T2, since the first D flip-flop state is not the same as the second D flip-flop state for at least one select signal. The selects stable signal 46 remains at a low state as long as (for at least one select signal) the state of the first flip-flop 36 differs from the state of the second flip-flop 38. The selects stable signal will go high only after the state of the first D flip-flop 36 in the stable selects block matches with that of the second flip-flop 38 for every select signal. Since in the diagram the select inputs are held at "11", this match occurs on the next rising edge 122 of the current system clock at time T3. The selects stable signal 46 goes high slightly after T3. A high state on the selects stable signal indicates that the new select signals are ready to be used and thus causes the newly decoded select signal to be passed onto the data inputs of the D flip-flops in the stable decoder block 14. Since these flip-flops are clocked by an inverted signal of the current system clock, the newly decoded select signals are latched in the D flip-flops on the falling edge 124 of the pulse that causes selects stable signal to go high. In the timing diagram this occurs at time T4.

Once the newly decoded select signals are latched into the D flip-flops in the stable decoder block 14 at T4, the system clk ready signal 90 of the output block 18 goes low slightly after that, indicating that the output clock is at present in transition from the current system clock to the new clock. This is because at T4 the decoded select signals selecting clk d have exited the stable decoder block 14 and entered the output block 18, but the sync select signals entering the output block 18 at T4 are previously decoded signals which still select clk a. Thus, the stable select signals and the sync select signals in the output block 18 at T4 do not agree and therefore at T4 no clock is selected. For this same reason, at T4 when the system clk ready signal of the output block goes low, so does the output clock of the output block.

Since the current system clock is used to clock the flip-flops in the stable selects block 12 and the stable decoder block 14, the output clock goes low in synchrony with the current system clock. Thus the current system clock, which in this case is clk a, is successfully disengaged from the output clock while it is in the low state.

The newly decoded select signals available at the outputs of stable decoder block 14 are fed to the synchronous selects block 16, which latches them in synchrony with their respective clocks. Since this embodiment utilizes two stages of flip-flops in the synchronous selects block 16, the select signals appear at the outputs after two cycles of their respective clocks. In this example, only stable select a and stable select d have changed. This change appears on sync select a and sync select d at time T5 and T6 respectively. Subsequent to the change of sync select d at T6, the newly selected clock, which in this example is clk d is then engaged to the output clock. Thus, the system clk ready signal 90 goes high slightly after T6 indicating that the system clock is now ready. Notice that since the D flip-flops in the synchronous select block 16 are sensitive to the falling edge of the clock, the new clock—clk d in this case, will become engaged to the output clock on its falling edge. Thus, the clock switch or transition works by disengaging clk a on its falling edge at T4, maintaining the low state on the output clock, until clk d gets engaged to the output clock again on its falling edge 126 at T6. Since the hand-off occurs from the current to the new clock on their low state, the possibility of glitches on the output clock is eliminated.

Figure 10:
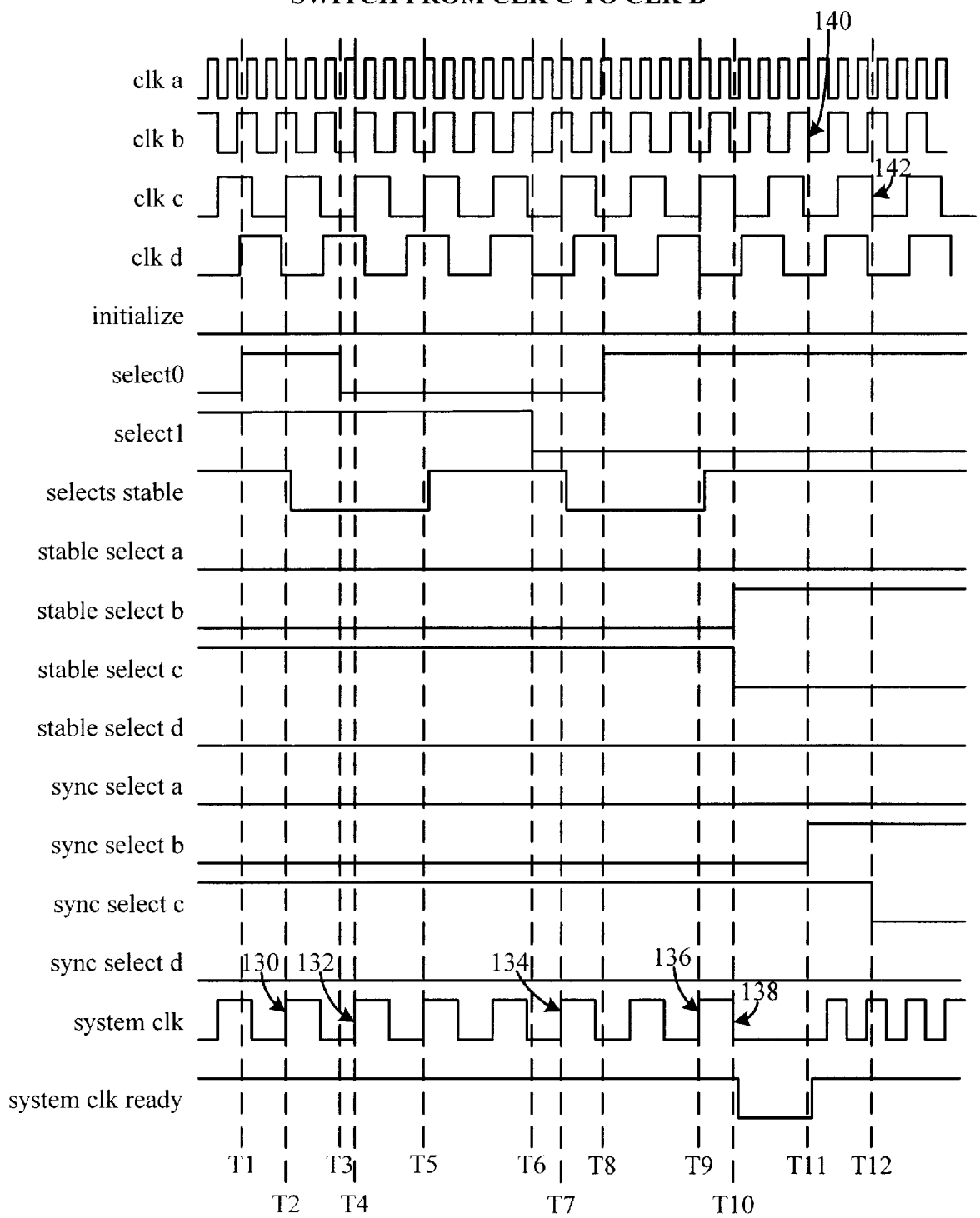
FIG. 10 shows a timing diagram illustrating the circuit response for spurious pulses on select signals and a clock switch from clk c to clk b.

Example Timing Diagram showing Spurious Pulses on Select Lines and Switching of the System Clock FIG. 10 depicts the response of the proposed binary encoded clock selection circuit for spurious pulses on select lines as well as the clock switch from current system clock clk c to clk b. Notice that at time T1 the select line select0 has changed from zero to one. This change is captured in the first flip-flop 36 of the stable selects block 12 on the following rising edge 130 of the system clock at time T2. Since the state of the first and second flip-flops in the register corresponding to select0 are now different, the selects stable signal 46 goes low slightly after time T2. From now until the time selects stable signal 46 goes high, the stable decoder block 14 recirculates the previous values for stable select a through stable select d. The next event occurs on select0 signal at time T3, where it has changed back to a low before the occurrence of the rising edge 132 of the system clock at T4. Since the select0 has only been at logic state one for less than two clock pulses of the system clock, its impact has not reached other blocks. Thus any changes on the input select lines select0 and select1 that are not maintained for at least two cycles of the system clock are ignored. This feature results in the immunity of the proposed circuit to spurious pulses on the input select lines. As can be seen in the timing diagram, clk c continues to be the system clock since select0 and select1 remain at zero and one respectively for two clock pulses at T4 and T5.

The switch of system clock from clk c to clk b is now described. In order to accomplish this switch, the select lines select 1 and select0 need to be changed from "10" to "01". Notice that both the select signals need to changed, and as mentioned before, this change on the select signals may not take place in the same amount of time due to the race conditions. The timing diagram in FIG. 10 illustrates the situation where select1 attains its final state before select0. In fact, select1 has changed from a high logic state to a low logic state at time T6, whereas select0 has changed from low to high at time T8. Notice that there is an intervening rising edge 134 of the system clock at time T7 between the select signal changes at T6 and T8. This rising edge causes the selects stable signal to go low slightly afterward since the select1 signal has changed its state. The selects stable signal changes to a high slightly after the rising edge 136 of the system clock at time T9, by which time both the select lines have maintained their logic state for at least two cycles of the system clock. A high on selects stable signal 46 indicates to the stable decoder that the new select signals are ready to be decoded. The newly decoded select signals are captured by the flip-flops in the stable decoder block 14 by the falling edge 138 of the system clock at time T10. The system clk ready signal goes low slightly after T10 indicating that the system clock is currently in the process of being switched.

The synchronous selects block 16 captures the newly decoded select signals in synchrony with their respective clocks. Since there are two flip-flops in this embodiment, the newly decoded select signals appear at the output of the synchronous select block 16 after two cycles of the respective clocks. Notice from FIG. 10 that sync select b signal has attained a high logic state, causing the system clk ready to go high as well, slightly after the falling edge 140 of the clk b at time T11. The final event occurs at time T12, where sync select c has changed to logic state zero on the falling edge 142 of clk c. Thus the system clock has successfully been changed from clk c to clk b. In a conventional clock selection circuit, the delayed changes on select1 and select0 input signals would have resulted in the system clock being switched from clk c to clk a (corresponding to 00 state on select1 and select0), and finally to clk b. Since the present invention has means to detect a change on the input select lines and recirculate the previously decoded select signals until the change on the input select signals has completed, the system clock switches directly from current system clock clk c to the intended final system clock clk b.

Although the timing diagrams show some signals being active high or active low and some edges being active rising or active falling, the circuits can easily be modified to change the active states and the active edges.

Flow Chart of a Method of Switching between Clocks Signals

Figure 11:
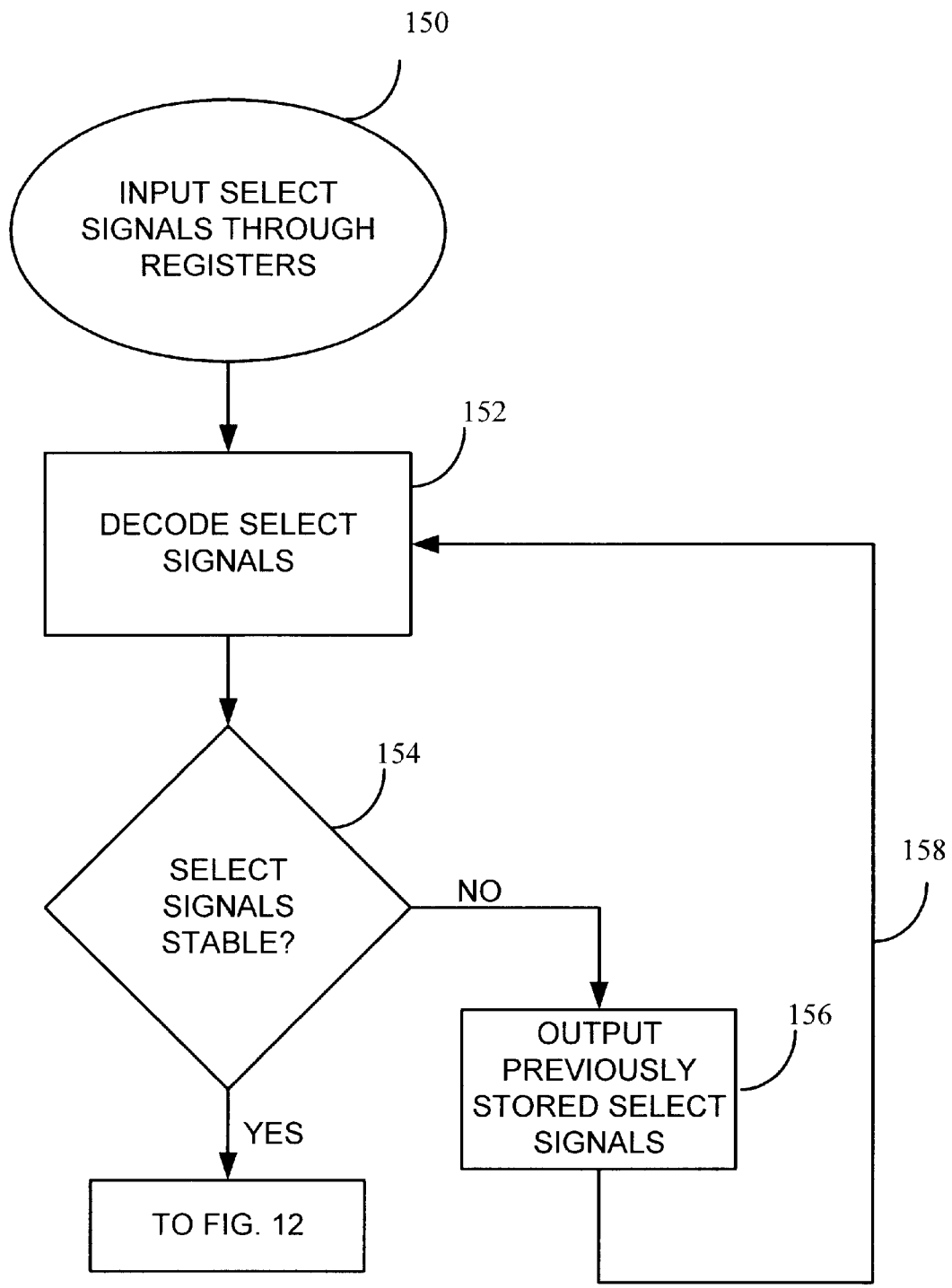
FIG. 11 is a flow chart of a method for switching between clock signals.

FIG. 11 is a flowchart of a method for switching the clock signals. In process block 150, clock selection signals are propagated through registers. As previously discussed, in one possible aspect, there would be one register for each signal and the registers would include serially coupled memory devices.

Process block 152 shows that the select signals are decoded. For example, if the signals were binary encoded and there were two select signals, the decoding could result in up to four decoded select signals. If one-hot encoding of the select signals was used, then the decoding is simply the propagation of the signals through wires, buffers or other similar structures.

At process block 154, a test of the selects stable signal is performed. If the selects stable signal indicates that the select signals are not stable then the previously stored decoded select signals are output (process block 156). As a result, the system clock is not changed. However, as indicated at 158, the decoded signals are continuously checked to determine stability.

If the selects stable signal indicates that the select signals are stable, then, the newly decoded select signals are output (process block 170)(see FIG. 12). The outputting of decoded select signals indicates a transition in the system clock and therefore the current system clock is disengaged (process block 172). The decoded select signals are then synchronized with their respective clocks (process block 174). The synchronization is accomplished by propagating each select signal through a register containing serially coupled memory devices. The memory devices in each register are driven by the respective clock of the signal being propagated through the register.

The synchronized decoded signals, the decoded select signals, and the clock signals, for each clock are combined (process block 176). As previously discussed, in one embodiment this is performed by ANDing them.

Finally, at process block 178, the selected clock signal obtained by ORing the outputs of the above-mentioned AND gates is output as the system clock.

Sample Application to Testing of Integrated Circuits

One skilled in the art will recognize that this invention has a very general application and can be used anywhere a clock needs to be reliably selected from multiple clocks. One area of application is in testing integrated circuits. The complexity of such circuits is increasing exponentially and so is the complexity of testing them. One of the techniques that is increasingly being adopted to contain test costs is called Built-In Self-Test (BIST). In traditional testing methods there is an external tester (such as an ATE (automated test equipment)) that supplies test stimulus to an integrated circuit and compares its response with the expected response. This requires that the tester store all the test data, somehow supply that test data to the integrated circuit under test, and also obtain the response from the circuit under test. In BIST on the other hand, test stimulus generation and test response analysis is performed by simple on-chip hardware. Since the test is administered by on-chip hardware it can be applied at the functional clock speed as opposed to a slower clock speed when an external tester is used. When BIST is employed, the external tester typically has to supply just a few control signals.

Integrated circuits can also incorporate a test structure called a Joint Test Action Group (JTAG), Test Access Port (TAP) controller to ease the testing of printed circuit boards built from these integrated circuits. The primary objective of the TAP controller is to simplify the interconnect test at the printed circuit board level. It accomplishes this by placing a special shift register on the input-output pins of an integrated circuit. The TAP controller consists of either four or five ports. These are the TCK (Test Clock), Test Data Input & Output, Test Mode Signal, and optionally the Test Reset ports.

When a TAP controller is used in conjunction with BIST, typically the TAP controller initiates BIST, waits until it receives an indication that BIST has finished, and finally checks the result of the BIST. To initiate BIST and check the result of the BIST, the TAP controller needs to be able to operate certain registers within itself as well as in the integrated circuit. The JTAG TAP controller standard mandates that all the registers targeted by the TAP controller utilize TCK for clocking them. In contrast, BIST is usually run by the functional clock for the integrated circuit in which it is installed. This implies that the clock going to the registers in the integrated circuit needs to be switched from TCK to the functional clock for the circuit at the beginning of the BIST. Similarly, once the BIST has finished and the result of the BIST is to be checked, the clock supplied to registers in the IC needs to be switched from the functional clock to TCK. Because in general, the frequencies of TCK and the functional clock do not have any relationship to each other, it is necessary to have a synchronizer that reliably switches the clock from TCK to the functional clock and vice versa.

As stated above, the testing of integrated circuits is merely one context in which a the present invention may be used. Many other applications where it is necessary to reliably select a system clock from multiple clocks will be apparent to those skilled in the art.

Concluding Discussion

It should be noted that in the illustrated circuits no assumptions are made regarding the relative frequency or phase of the clocks with respect to each other. Additionally, no assumptions are made regarding the source or sources of the clocks or the number of clocks.

The selection and switching of clocks is achieved with a simple circuit and without any need for special signals to initiate and terminate the clock switch from the current selected clock to a new clock. In addition, the clock select signals can employ any encoding scheme, such as one-hot encoding requiring N select signals for N clocks, two-hot encoding requiring 2N select signals for N clocks, or binary/Gray encoding requiring a minimum of ceil($\log_2 N$) select signals for N clocks. Other possible encoding schemes will be apparent to those skilled in the art.

It will be obvious to those having skill in the art that many changes may be made to the above-described embodiments of this invention without departing from the underlying principles thereof.

For example, although particular logic gates are shown, one skilled in the art would recognize that other equivalent logic gates or combinations of logic gates could be designed and used instead.

Additionally, although only one embodiment of the synchronous selects block and output block are shown, these blocks can easily be modified to accomplish similar functionality. The particular design of such blocks is not important to the invention. One skilled in the art would recognize that modifications to the blocks, in one or more alternative embodiments, could easily be made to include one or more of the following:

1. Referring to FIG. 2, couple the input of one or more of the flip-flops 36 and 38 to XNOR gate 42. This could allow the testing of the stability of the input select signals 20 for an additional clock cycle without adding an additional flip-flop. In addition, using this approach, only one flip-flop 36 (whose input and output would be tested by the XNOR gate 42) could be used in a register 30. In this event, stability over one clock cycle of the system clock would be tested.

2. The Stable Selects Block 12, could be reduced or eliminated, with logic coupled to the Stable Decoder Block 14 that determines that the select signals 20 are stable by detecting a change of state and waiting a predetermined period of time. Thus stability is assumed by measuring the amount of time that has elapsed since a detected change in the logic state of the select signals 20. When the elapsed time is at least as great as the predetermined period of time, the select signals 20 are considered stable. Testing the logic state of individual serially-coupled memory devices, such as illustrated in FIG. 2, could, consequently be eliminated.

3. Depending on the number of clocks to be selected from and the encoding mechanism chosen, a single select signal 20 could be used to select the desired clock from at least two clocks.

4. There could be fewer registers than the number of select signals. For example, some select signals, such as signals whose logic state has recently changed, can be monitored for stability and others assumed stable.

5. As has been stated, any encoding mechanism could be used to encode the select signals. Besides the binary encoding and one-hot encoding mechanisms that have been specifically disclosed, other encoding mechanisms that could be used would be apparent to one skilled in the art.

Once a person skilled in the art is familiar with the principles underlying the embodiments disclosed herein, additional embodiments varying one or more of the aspects of the disclosed embodiments could easily be designed.

In view of the many possible embodiments to which the principles of our invention may be applied, it should be recognized that the illustrated embodiments are only examples and should not be taken as a limitation on the scope of the invention. Rather, the scope of the invention is defined by the following claims. We therefore claim as our invention all that comes within the scope of these claims.

We claim:

1. A circuit for switching between multiple input clock signals, comprising:

a plurality of clock selection signals used to identify one of the multiple clock signals;

a plurality of registers coupled to the clock selection signals, wherein the registers comprise one or more memory devices;

logic coupled to the plurality of registers that generates a stable signal indicating the clock selection signals have been stable for a predetermined period of time;

wherein the switching from a current input clock to a new input clock occurs in response to the stable signal indicating that the clock selection signals have been stable for at least the predetermined period of time; and wherein the current clock continues uninterrupted until the stable signal indicates that the clock selection signals have been stable for at least the predetermined period of time.

2. The circuit of claim 1, wherein the clock selection signals are binary encoded.

3. The circuit of claim 1, wherein the clock selection signals are one-hot encoded.

4. The circuit of claim 3, further including logic coupled to the clock selection signals that ensures only one of the clock selection signals is recognized as being active.

5. The circuit of claim 1, wherein there is no logic coupled to the clock selection signals that ensures only one clock is uniquely identified by the clock selection signals.

6. The circuit of claim 1, wherein the number of registers is equal to the number of clock selection signals.

7. The circuit of claim 1, wherein the number of registers is less than the number of clock selection signals.

8. The circuit of claim 1, wherein the memory devices are D-type flip-flops.

9. The circuit of claim 1, wherein the memory devices are latches.

10. The circuit of claim 1, further including a clock signal coupled to the memory devices and wherein the predetermined period of time is at least one clock cycle of the clock signal.

11. The circuit of claim 1, wherein the logic generates the stable signal, at least in part, by sampling the input of at least one memory device.

12. The circuit of claim 1, wherein the logic generates the stable signal, at least in part, by sampling the logic state stored in at least one memory device.

13. The circuit of claim 1, wherein the stable signal is generated from signals indicating that the memory devices in a register are at the same logic state.

14. The circuit of claim 1, wherein the logic coupled to the plurality of registers includes:

first level logic which generates a signal indicating whether memory devices in a register are at the same logic state and that provides an output signal indicating the register is stable; and second level logic that combines the output signals of the first level logic to generate the stable signal.

15. The circuit of claim 1, wherein if there are two or more memory devices in a register, the two or more memory devices are serially coupled.

16. A circuit for determining whether to switch from the current system clock to one of multiple clocks, comprising:

selection signals that identify a desired system clock;

first logic coupled to the selection signals that generates a stable signal indicating that the selection signals have been stable for at least a predetermined period of time;

memory devices for storing a previous state of the selection signals; and second logic coupled to the memory devices and the first logic providing an output that is either associated with the desired system clock if the stable signal indicates the selection signals have been stable for at least the predetermined period of time or that is associated with the previous state of the selection signals if the stable signal indicates the selection signals have not been stable for at least the predetermined period of time so that the current system clock continues without interruption until the stable signal indicates stability.

17. The circuit of claim 16, wherein the selection signals are binary encoded.

18. The circuit of claim 17, further comprising logic to decode the selection signals.

19. The circuit of claim 16, wherein the selection signals are one-hot encoded.

20. The circuit of claim 19, further comprising logic to ensure that only one of the selection signals is at a logic state indicating the selection of its corresponding clock.

21. The circuit of claim 16, wherein the output of the second logic is coupled to a circuit for synchronizing the output to the desired system clock.

22. The circuit of claim 16, wherein there is only one selection signal and the logic state of the selection signal identifies the desired system clock.

23. A method of transitioning a system clock between one of a plurality of different clock signals, comprising:

providing select signals used to identify a selected one of the plurality of different clock signals;

switching at least one of the select signals to indicate a desired transition from a current system clock to one of the plurality of clock signals identified by the select signals;

determining whether the select signals remain stable for at least a predetermined period of time;

if the select signals remain stable for at least the predetermined period of time, transitioning the system clock from the current system clock to the selected clock signal; and if the select signals do not remain stable for at least the predetermined period of time, maintaining the current system clock without interruption.

24. The method of claim 23, wherein the select signals are encoded using a binary encoding scheme.

25. The method of claim 23, further comprising decoding the binary encoded signals such that only one decoded signal is at a logic state indicating the selection of its corresponding clock.

26. The method of claim 23, wherein the select signals are encoded using one-hot encoding.

27. The method of claim 26, further comprising ensuring that only one of the select signals is at a logic state indicating the selection of its corresponding clock.

28. The method of claim 23, wherein the predetermined period of time is at least one clock cycle.

29. The method of claim 23 wherein the determining includes:

inputting a select signal into a register; and testing the output of memory devices in the registers to determine whether the memory devices are at the same logic state.

30. The method of claim 29 wherein testing further comprises first generating register signals indicating whether memory devices in a register are at the same logic state and then generating, from the register signals, a signal indicating whether the memory devices have been stable for a predetermined period of time.

31. The method of claim 23, wherein the select signals are determined to have remained stable for at least a predetermined period of time if the select signals have not switched to identify a different one of the plurality of clocks signals for at least the predetermined period of time.

32. The method of claim 23, wherein the select signals are determined to have remained stable for a predetermined period of time if, after a change in the logic state of one or more select signals, the predetermined period of time has elapsed.

33. The method of claim 23, wherein the select signals are determined to have remained stable for at least a predetermined period of time if the select signals that were switched have remained stable for the predetermined period of time.

34. A circuit for transmitting clock selection signals if they are stable, as part of a circuit for selecting one of multiple input clocks, comprising:

means for determining if input clock selection signals have been stable for a predetermined period of time;

means for storing a previous state of the clock selection signals; and means, for outputting the clock selection signals if they have been stable for a predetermined period of time and otherwise outputting without interruption previously stored clock selection signals.

35. A circuit, as part of a circuit for determining whether to switch from the current system clock to one of multiple clocks, comprising:

one or more selection signals that identify a desired system clock;

one or more memory devices for storing a previous state of the selection signals; and logic coupled to the memory devices that outputs the selection signals if, after a change in the logic state in one or more of the select signals, a predetermined period of time has elapsed, and otherwise, if the predetermined period of time has not elapsed, outputs the previous state of the selection signals.

36. The circuit of claim 35, wherein the selection signals are output only if they are determined to have remained stable during the predetermined period of time, and otherwise outputting the previous state of the selection signals.

37. The circuit of claim 35 wherein the selection signals are output only if, during the predetermined period of time, the logic state of the signals has not switched to identify a different desired system clock, and otherwise outputting the previous state of the selection signals.

38. The circuit of claim 35, wherein the selection signals are output only if a selects stable signal input to logic indicates that the selection signals have been stable during the predetermined period of time, and otherwise outputting the previous state of the selection signals.

39. The circuit of claim 38, wherein the selects stable signal is input to the logic from testing logic coupled to the logic that samples the selection signals as they are propagated through memory devices.

40. The circuit of claim 35, wherein the selection signals are output only if those of the selection signals which changed logic state at the beginning of the predetermined period of time have remained stable and no other selection signals have changed during the predetermined period of time, and otherwise outputting the previous state of the selection signals.

41. The circuit of claim 35, further comprising decoding logic through which the selection signals are propagated that decodes the selection signals and ensures that the decoded selection signals uniquely identify a selected one of the multiple clocks as the desired system clock.

\* \* \* \* \*